Oct. 18, 1938.   G. W. PIERCE   2,133,644
ELECTRICAL SYSTEM
Filed Jan. 9, 1928

Inventor
George W. Pierce
By David Rines
Attorney

Patented Oct. 18, 1938

2,133,644

UNITED STATES PATENT OFFICE 2,133,644

ELECTRICAL SYSTEM

George W. Pierce, Cambridge, Mass.

Application January 9, 1928, Serial No. 245,310

18 Claims. (Cl. 250—36)

The present invention relates to electrical systems, and more particularly to producing and sustaining the oscillations of electrical systems employing electro-mechanical vibrators, like piezo-electric crystals.

Such vibrators, as is now well known, execute mechanical vibrations under vibratory electrical stimulus and, conversely, develop electrical potentials as a result of their mechanical vibrations. They have, in general, a plurality of particular modes or periods of mechanical vibration, of different frequency. For convenience, the action of the electric forces that cause mechanical displacements of the crystal, resulting in its vibration, will be termed "stimulation"; and the development by the vibrating crystal of the electromotive forces that react upon the circuit will be termed "response".

These mechanical and electrical effects are normally transitory, for the crystal body will not, of itself, persist in continuous vibration. An object of the present invention, however, is to provide a novel system for rendering these effects oscillatory in character, and persistent.

A further object is to provide an improved system for producing oscillations at very nearly constant frequency.

Another object is to improve the efficiency of oscillatory systems.

It is still another object to improve upon and simplify the electrical connections of oscillatory systems.

Other and further objects of the invention will be explained hereinafter, and will be pointed out in the appended claims, it being understood that it is intended to cover in the appended claims all the novelty that the invention may possess.

Figure 1:
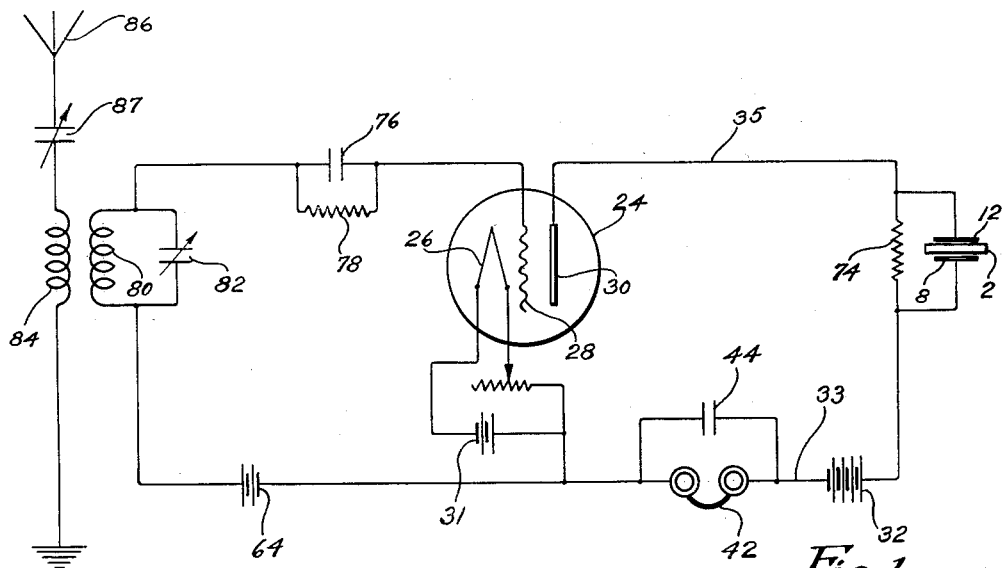
Figure 2:
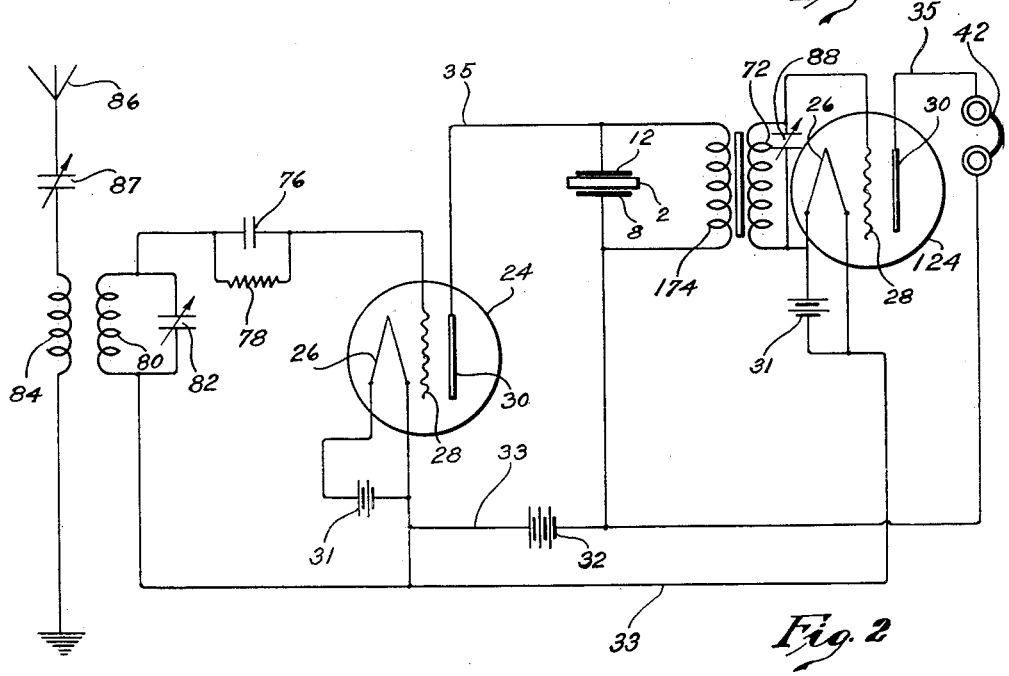

In the accompanying drawing, Fig. 1 is a diagram of circuits and apparatus illustrating the invention as applied to a radio-receiving system; and Fig. 2 is a similar diagram of a modification.

The preferred form of electro-mechanical vibrator is illustrated as a two-electrode piezo-electric crystal plate 2, adjacent to the oppositely disposed sides or surfaces of which are provided the two opposed conducting electrodes, terminals or plates 8 and 12 by means of which the vibrator is adapted to be connected in an electric circuit. Such a crystal plate is sometimes termed a piezo-electric resonator. The electrodes 8 and 12 are disposed substantially perpendicular to an electric axis of the crystal.

For illustrative purposes, a hermetically sealed, electron-discharge, vacuum-tube container 24 is diagrammatically shown provided with three sensitive elements or electrodes, namely, an electron-emitting cathode filament 26, a first, cold electrode, shown as a control grid 28 and a second, cold electrode, shown as a plate 30. As illustrated, the cold electrodes 28 and 30 are unequally spaced from the cathode 26, the electrode 28 being the inner cold electrode and the electrode 30 being the outer cold electrode. The filament 26 is connected with a filament-heating battery 31. A plate battery 32 is connected with the filament 26 by a conductor 33, and with the plate 30 by a conductor 35. The plate battery 32 constitutes a source of energy for charging the plate 30 with a unidirectional, suitably operating potential. If desired, a biasing battery 64 may be employed to bias the grid 28, the battery 64 constituting a means for charging the grid 28 with a different predetermined unidirectional, suitably operating potential, so that the potential of the grid may fluctuate about the biased value.

The two-electrode, piezo-electric crystal 2 is shown connected in the plate circuit, that interconnects and includes the plate and the cathode, and is shown in Fig. 1 effectively connected in parallel with, or shunted by, that portion of the plate circuit that is illustrated as a bypass 74 for direct current. The bypass 74 may be a radio choke, an inductance coil or winding, a resistor, or a combination of these. The bypass 74 is preferably chosen so that the circuits shall have parameters such as to make the system stably non-oscillatory when the crystal is removel or restrained from vibration. A blocking condenser 76, shunted by a leak resistor 78, and a winding or inductance coil 80, shunted by a tuning condenser 82, to render the grid circuit tunable, are connected in the grid circuit, that interconnects and includes the cathode and the grid. The plate and the grid circuits are substantially mechanically and electrically disassociated from each other except for the association introduced, or caused by the electron stream between the plate and the cathode within the space-discharge, electron-tube container 24. If the parameters of the circuits are properly chosen, as by approximate adjustment of the condenser 82, continuous oscillations will be set up in the system at a frequency determined by that mode of vibration of the vibrator corresponding to a natural or resonant frequency of the crystal in the direction of its electric axis, though it will not oscillate in the absence of the crystal. The electrodes 8 and 12 act conjointly both for stimulation and response, the vibrator being stimulated by the oscillations so as to be maintained in vibration, and responding to maintain the system in oscillation, with a fixed period determined by the vibrator. The system will oscillate even though the parameters be varied to within very wide limits, and the frequency will be maintained constant irrespective of variations in plate or filament voltage, load or other factors. This is not true of self-oscillating circuits in which the crystal acts merely as a stabilizer. In the latter case, variation in the parameters of the circuit will result in the crystal ceasing to vibrate, though the circuits continue to oscillate. The system can be used as an oscillatory circuit.

As the invention is illustrated as employed in a receiving circuit, the winding 80 is shown coupled to a winding 84, in series with a receiving antenna 86 and a condenser 87, and grounded or connected with a counter-poise. It will be understood, however, that the invention is not restricted to use in receiving systems; the illustrated receiving system being chosen merely as a convenient medium for illustrating the invention. A telephone receiver 42, with or without a bypass condenser 44, may be inserted in the plate circuit of the receiving tube. Where the telephone is not needed, it may be replaced by an inductance, the primary winding of a transformer, or the input terminals of an amplifier, or it may be wholly short-circuited. The locally generated oscillations of the circuits of the tube 24 will beat with the oscillations received by the antenna 86, according to well known principles, rendering the received signals audible in the telephone 42.

The present invention, therefore, provides an electric system comprising an electric circuit that is not, in itself, oscillatory, in combination with a vibrator, the electrical parameters or constants of the system being such as to render the system stably non-oscillatory when not under the contr ˙ of the electro-mechanical vibrator; and su˙ hc˙ever, that the resulting electrical system ˙ c l˙tes at a frequency substantially equal to the frequency of one of the modes of mechanical vibration of the vibrator.

The word "admittance", which is quantitatively the reciprocal of an impedance, is herein used to designate an electrical circuit element or combination of elements, looked at with reference to its facility for passing current under a given electromotive force. The winding 80 and the condenser 82, for example, constitute an admittance. A piezo-electric crystal provided with electrodes also constitutes an admittance.

The invention is readily adapted to power-amplifying systems, as illustrated in Fig. 2. The bypass 74 is here in the form of an element 174 that is actively related to the grid circuit of a second tube 124 to produce audio-current amplification. The element 174 is shown as the primary coil of an audio transformer the secondary coil 72 of which is connected in the grid circuit of the tube 124. It is possible to use the element 174 as a transformer coil because the high-frequency oscillations do not need to pass through this element. This arrangement, therefore, effects an economy of apparatus, as the same bypass 174 serves also as a coupling between the two tubes 24 and 124. The vibrator 2 determines the frequency of oscillation of the master oscillating circuit comprising the vacuum tube 24, and the latter controls, through a fundamental or one of the many harmonics, an output in the tube 124 of much larger power. The oscillations existing in the present crystal oscillator, due to the action of the crystal and the distorting effects of the vacuum tubes and the circuit, are rich in harmonics, as disclosed in the hereinafter-mentioned, American-Academy publication. To obtain and amplify any desired harmonic frequency in he circuits of the tube 24, the audio transforme 174, 72 may be replaced by a radio transfo ˙er, with proper impedance in the coils 174 a˙d 72 and proper adjustments of the circuits of the tube 124, as by means of a tuning condenser 88, so that the circuit 72, 88 resonates to the desired harmonic. The constancy of the frequency makes it possible to use high-peak transformers and the increased amplification obtained thereby.

Other methods of connection for harmonic amplification may be effected by replacing the telephone 42, in Fig. 1, by the input terminals of an amplifier, as before stated, with any suitable disposition of the amplifier connections.

The invention may be applied also to many other uses. The oscillations, together with their harmonics, may, for example, serve as fixed values for the calibration of wavemeters and frequency meters, as is explained in my paper entitled "Piezo-electric crystal resonators and crystal oscillators applied to the precision calibration of wavemeters", published in the "Proceedings of the American Academy of Arts and Sciences", vol. 59, No. 4, October, 1923.

The oscillators may also be employed, with or without amplification, to serve as sources in carrier-wave systems, or to act in the receiving apparatus of a carrier-wave system.

The vibrations of the electro-mechanical vibrator may, in accordance with the present invention, be communicated to air or to some other elastic medium, as water, to produce sound for intercommunication or any other desired purposes.

Other uses and applications and other modifications within the scope of the present invention will readily occur to persons skilled in the art. It is therefore desired that the above-described embodiments of the invention shall be regarded as illustrative of the invention, and not restrictive, and that the appended claims shall be construed broadly, except insofar as it may be necessary to impose limitations in view of the prior art.

What is claimed is:

1. An electromechanical system having, in combination, vacuum-tube apparatus comprising three electrodes, namely, a filament, a grid and a plate, a condenser and an inductance connected with the filament electrode and the grid electrode in parallel relation, an electromechanical vibrator having only two electrodes serving both for stimulation and response, and means connecting the vibrator electrodes with the filament electrode and the plate electrode to cause said system to oscillate with a frequency determined by said electromechanical vibrator.

2. An electromechanical system for producing oscillations having, in combination, a vacuum tube, a grid electrode, a plate electrode, and a filament electrode actively cooperating therein, a tunable electric element between the filament electrode and the grid electrode, and an electromechanical vibrator between the filament electrode and the plate electrode, said system being adjusted to oscillate with a frequency determined by said electromechanical vibrator and essentially independent of variations of the parameters of the electrical elements of the system.

3. An oscillatory system having, in combination, vacuum-tube apparatus having a cathode electrode, a grid electrode and a plate electrode, a circuit including said plate electrode and said cathode electrode, another circuit including said grid electrode and said cathode electrode, means for charging said plate electrode with a unidirectional potential, means for charging said grid electrode with a different unidirectional potential, a piezo-electric crystal having two electrodes only, and means connecting the first-named means and the crystal in the first-named circuit to constitute an oscillatory system, the parameters of the system having electrical characteristics such as to render the system oscillatory under the control of the crystal at a substantially constant frequency determined by a mode of vibration of the crystal, and such as to render the system stably non-oscillatory when not under the control of the crystal.

4. An oscillatory system having, in combination, vacuum-tube apparatus having a cathode electrode, a grid electrode and a plate electrode, a circuit including the grid electrode and the cathode electrode, a piezo-electric crystal having two electrodes only, and means connecting one of the crystal electrodes with the cathode electrode and the other crystal electrode with the plate electrode to constitute an oscillatory system in which the two crystal electrodes will act conjointly both for stimulation and response, the parameters of the system having electrical characteristics such as to render the system oscillatory under the control of the crystal at a substantially constant frequency determined by a mode of vibration of the crystal, and such as to render the system stably non-oscillatory when not under the control of the crystal.

5. An oscillatory system having, in combination, a vacuum tube having a cathode electrode, a grid electrode and a plate electrode, a circuit including said plate electrode and said cathode electrode, another circuit including said grid electrode and said cathode electrode, a piezo-electric crystal having two electrodes only, and means connecting the crystal in the first-named circuit to constitute an oscillatory system in which the electrodes shall act conjointly both for stimulation and response, the parameters of the system having electrical characteristics such as to render the system oscillatory under the control of the crystal at a substantially constant frequency determined by a mode of vibration of the crystal, and such as to render the system stably non-oscillatory when not under the control of the crystal.

6. An oscillatory system having, in combination, a hermetically sealed container having therein a cathode electrode and a plurality of cold electrodes unequally spaced from the cathode electrode, circuits connecting said cold electrodes with said cathode electrode, said circuits being substantially electrically and mechanically disassociated except at the common connection to the cathode electrode and except by virtue of the association of the cathode electrode and the cold electrodes within said container, a piezo-electric crystal having two electrodes only, and means connecting the crystal electrodes between the cold electrode farther from the cathode electrode and the cathode electrode to constitute an oscillatory system in which the crystal electrodes shall act conjointly both for stimulation and response, the parameters of the system having electrical characteristics such as to render the system oscillatory under the control of the crystal at a substantially constant frequency determined by a mode of vibration of the crystal, and such as to render the system stably non-oscillatory when not under the control of the crystal.

7. An oscillatory system having, in combination, vacuum-tube apparatus having a cathode electrode, a grid electrode and a plate electrode, a coil connected between the grid electrode and the cathode electrode, means for subjecting the grid electrode to a desired unidirectional, operating potential, a piezo-electric crystal having two electrodes only, means connecting one of the electrodes with the cathode electrode and the other electrode with the plate electrode to constitute an oscillatory system in which the crystal electrodes shall act conjointly both for stimulation and response, and means conductive to direct current for subjecting the plate to a desired operating potential, the parameters of the system having electrical characteristics such as to render the system oscillatory under the control of the crystal at a substantially constant frequency determined by a mode of vibration of the crystal, and such as to render the system stably non-oscillatory when not under the control of the crystal.

8. An oscillatory system having, in combination, a multi-electrode device having, within a hermetically sealed container, a cathode electrode, a grid electrode and a cold electrode, a circuit including the grid electrode and the cathode electrode, a piezo-electric crystal having two electrodes only, and means connecting one of the crystal electrodes with the cathode electrode and the other crystal electrode with the cold electrode to constitute an oscillatory system in which the crystal electrodes will act conjointly both for stimulation and response, and means conductive to direct current for subjecting the cold electrode to a positive potential with respect to the cathode electrode, the parameters of the system having electrical characteristics such as to render the system oscillatory under the control of the crystal at a substantially constant frequency determined by a mode of vibration of the crystal, and such as to render the system stably non-oscillatory when not under the control of the crystal.

9. An electron-discharge-device oscillator comprising an electron-discharge device having an anode, a cathode and a control electrode, means for polarizing the electrodes of said electron-discharge device, a piezo-electric-crystal resonator coupled to the anode and the cathode electrodes of said electron-discharge device, and a choke coil effectively in shunt with said piezo-electric crystal, the inductance of the coil together with the capacity of the electrodes of said crystal and the interelectrode capacity of said electron-discharge device being such as to resonate at a frequency substantially less than the frequency at which said crystal is caused to operate.

10. An electron-discharge-device oscillator comprising an electron-discharge device having an anode, a cathode and a control electrode, means for polarizing the electrodes of said device, a piezo-electric crystal for controlling the frequency of oscillations generated by said device, said piezo-electric crystal being connected between the anode and the cathode electrodes of said device, and a choke coil for supplying unidirectional potential to one of the electrodes to which said piezo-electric crystal is connected, the inductance of the choke coil together with the capacity of the electron-discharge device and the electrodes of said crystal being such as to resonate at a frequency from 50% to 80% of the frequency of oscillations generated by said electron-discharge device oscillator.

11. In apparatus of the character described, an electron-discharge device having, within an hermetically sealed container, an electron-emitting cathode, an anode, and a grid structure intermediate the anode and the cathode, a piezo-electric crystal connected to the anode and the cathode of said electron-discharge device for starting and maintaining oscillation generation by said device at a frequency corresponding to a natural frequency of said crystal, and a circuit effectively in shunt with said crystal for establishing a unidirectional current path to an electrode of said device to which said crystal is connected, said circuit in combination with the capacities associated with said piezo-electric crystal being of such a value in impedance as to resonate at a frequency substantially lower than the frequency of oscillation of said crystal.

12. In apparatus of the character described, an electron-discharge device having, within an hermetically sealed container, an electron-emitting cathode, an anode, and a grid structure intermediate the anode and the cathode, a piezo-electric crystal connected to the anode and the cathode of said electron-discharge device for starting and maintaining oscillation generation by said device at a frequency corresponding to a natural frequency of said crystal, and a circuit effectively in shunt with said crystal for establishing a unidirectional current path to an electrode of said device to which said crystal is connected, said circuit in combination with the capacities associated with said piezo-electric crystal being of such a value in impedance as to resonate at a frequency from 50 to 80 percent of the frequency of oscillation of said piezo-electric crystal.

13. Oscillatory apparatus comprising an electron-discharge device having, within an evacuated container, an anode, an electron-emitting cathode, and an electrode intermediate the anode and the cathode, means for polarizing the intermediate electrode to a negative potential relative to said cathode, means to polarize the anode to a positive potential with respect to said cathode, an electromechanical resonator, connections connecting said electromechanical resonator to the anode and the cathode electrodes for starting and maintaining generation of oscillations at a frequency corresponding to a frequency of said electromechanical resonator, the inductance of said connections together with the electrical characteristics of said resonator and the interelectrode capacity of said device being such as to resonate at a frequency substantially less than the frequency at which said resonator vibrates.

14. An electron-discharge device oscillator comprising an electron-discharge device having an anode electrode, a cathode electrode and a control electrode, means for polarizing the electrodes of said device, a piezo-electric crystal for controlling the frequency of oscillations generated by said device, said piezo-electric crystal being connected between the anode and the cathode electrodes of said device, and a choke coil for supplying unidirectional potential to one of the electrodes to which said piezo-electric crystal is connected, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

15. An electron-discharge device oscillator comprising an electron-discharge device having an anode electrode, a cathode electrode and a control electrode, means for polarizing the electrodes of said electron-discharge device, and a piezo-electric crystal resonator having two electrodes only coupled to the anode and the cathode electrodes of said electron-discharge device, the parameters of the oscillator having electrical characteristics such as to render the oscillator oscillatory under the control of the resonator at a substantially constant frequency determined by a mode of vibration of the resonator, and such as to render the oscillator stably non-oscillatory when not under the control of the resonator.

16. An electron-discharge device oscillator having, within an hermetically-sealed container, an electron-emitting cathode electrode, an anode electrode, and a grid electrode structure intermediate said anode and cathode electrodes, and a piezo-electric crystal having two electrodes only connected to the anode and the cathode electrodes of said electron-discharge device for starting and maintaining oscillation generation by said device at a frequency corresponding to a natural frequency of said crystal, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

17. Apparatus of the character described having, in combination, an electron-discharge device oscillator having a single hermetically-sealed container provided with an electron-emitting cathode electrode, an anode electrode, and a grid electrode structure intermediate the anode and the cathode electrodes, a single piezo-electric crystal connected to the anode and the cathode electrodes of said electron-discharge device for starting and maintaining oscillation generation by said device at a frequency corresponding to a natural frequency of said crystal, and a circuit effectively in shunt with said crystal for establishing a unidirectional current path to an electrode of said device to which said crystal is connected, the parameters of the oscillator having electrical characteristics such as to render the oscillator oscillatory under the control of the crystal at a substantially constant frequency determined by a mode of vibration of the crystal, and such as to render the oscillator stably non-oscillatory when not under the control of the crystal.

18. Oscillatory apparatus comprising an electron-discharge device having within an evacuated container an anode electrode, an electron-emitting cathode electrode and an electrode intermediate said anode and cathode electrodes, means for polarizing the electrodes of said electron-discharge device, an electromechanical resonator having two electrodes only, and connections connecting said electromechanical resonator to the anode and the cathode electrodes for starting and maintaining generation of oscillations at a frequency corresponding to a frequency of said electromechanical resonator, the parameters of the oscillatory apparatus having electrical characteristics such as to render the oscillatory apparatus oscillatory under the control of the resonator at a substantially constant frequency determined by a mode of vibration of the resonator, and such as to render the oscillatory apparatus stably non-oscillatory when not under the control of the resonator.

GEORGE W. PIERCE.